Patented Nov. 9, 1937

2,098,544

UNITED STATES PATENT OFFICE 2,098,544

PROCESS OF MANUFACTURE OF SHREDDED GRAIN PRODUCT

James Robert Hill, Battle Creek, Mich., assignor to Ralston Purina Company, St. Louis, Mo., a corporation of Missouri No Drawing. Application July 5, 1935,
Serial No. 29,919

2 Claims. (Cl. 99—84)

My invention relates to the manufacture of shredded cereal grain products, and particularly to a process for manufacture of shredded wheat food products whereby flavoring material is incorporated therein.

Under the usual process of making shredded wheat biscuit, for example, the whole wheat berries are cooked in a steam pressure cooker until the starch is properly gelatinized, and after partial drying and tempering until the berries are uniform in moisture, they are then run through shredding rolls to form shreds which are so shaped and severed as to produce the unit shape desired, and this unit is then baked and toasted to the desired crispness.

The reason for maintaining the wheat berry in its original unitary form for delivery to the shredding rolls is that if the berry is cut or cracked before cooking, small pieces of the endosperm are broken free and cook into a sticky mass which gums on the shredding rolls and the knives which clean the rolls. Also, if some particles of the wheat are substantially larger than others they will not be thoroughly cooked by the time cooking of the smaller particles is complete.

While it has long been considered desirable that shredded wheat products be flavored by materials cooked into the product, attempts to accomplish this result have not, so far as applicant knows, been successful.

While the bran coat of the wheat berry is permeable to the extent that it permits the penetration of water, any addition to the water of flavoring material—such as salt, sugar, and malt, or other dissolved substances—creates osmotic relationships which inhibit the passage of flavoring material and reduce permeability of the bran to water. Thus, while whole wheat berries cook quite readily in water, the addition of salt, sugar, malt, and other dissolved substances not only does not impart a flavor to the wheat, but delays the cooking by restricting the entrance of water into the wheat berry.

By my invention flavored shredded wheat products can be made without encountering the mechanical difficulties incident to so cutting or crushing the wheat berry as to destroy its unitary form, and in accordance with my process, washed wheat berries are tempered with fourteen to eighteen parts of water for about twelve hours, which treatment leaves the wheat in a tough rubbery condition, and containing twenty-six to thirty percent moisture. The wheat berries are then passed between smooth rolls so adjusted as to deform them by flattening to a sufficient extent to produce cracks through the bran coat, but not to break the berry into parts or break off particles of the endosperm. I then give the wheat a short cooking of about twenty minutes at a steam pressure of approximately twenty-five pounds. This cooking warms the wheat and opens the cracks in the bran coat due to the swelling of the endosperm and prepares the grain for absorption of flavoring material.

Any suitable flavoring material can then be applied, and as an example the following flavoring compound may be added for each one hundred pounds of wheat (weight in its dry state before any treatment): 2 pounds of salt, 4 pounds of cane sugar, 3 pounds of barley malt extract, 3 pounds dried milk, and 8 pounds of water.

After the flavoring material is added, the cooking is continued to completion, but under lower steam pressure (approximately sixteen pounds). Lower pressure is employed for the reason that at higher pressures and with the particular flavoring materials described, there is a tendency to darken the color of the wheat.

After the cooking is completed, any condensed surface moisture is removed by currents of hot air, and the wheat is then allowed to temper until the grains feel tough and rubbery, after which they are run through shredding rolls to form shreds. Further procedure may be in accordance with any known or desirable methods of so assembling the shreds and severing them as to produce a "biscuit" or other product of the desired shape, and then baking or toasting to the desired extent.

While I have described my process as applied to making flavored shredded wheat products, it is to be understood that the scope of my invention is not limited to this particular application and may be employed in shredding other grains.

Having fully described my invention, what I claim as new and desire to secure by Letters Patent of the United States is:

1. The process of manufacture of a flavored shredded grain product which comprises softening the natural grains, applying deforming pressure to the grains sufficient to produce cracks in the exterior coating but insufficient to cause breaking off of any parts of the grains, partially cooking the grains, treating the grains with a flavoring material, and delivering them in whole grain form to shredding rolls.

2. The process of manufacture of a malt flavored shredded whole wheat product which comprises soaking the whole wheat grains in water, passing them between rolls adjusted to rupture the bran coating but not to cause any disintegration of the grains, partially cooking the grains, applying flavoring material embodying malt and continuing the cooking to completion in the presence of said flavoring material, tempering the wheat to such an extent as to secure the desired moisture content for shredding, and then delivering the cooked grain in whole grain form to shredding rolls.

JAMES ROBERT HILL.